US008161128B2

(12) United States Patent
Yudenfriend

(10) Patent No.: US 8,161,128 B2
(45) Date of Patent: Apr. 17, 2012

(54) SHARING OF DATA ACROSS DISJOINT CLUSTERS

(75) Inventor: Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/639,338

(22) Filed: Dec. 16, 2009

(65) Prior Publication Data
US 2011/0145243 A1    Jun. 16, 2011

(51) Int. Cl.
G06F 13/00 (2006.01)
(52) U.S. Cl. .......... 709/214; 709/215; 709/224
(58) Field of Classification Search .......... 709/213, 709/214, 215, 223, 224; 707/705, 713
See application file for complete search history.

(56) References Cited

U.S. PATENT DOCUMENTS

| | | |
|---|---|---|
| 5,471,609 A | 11/1995 | Yudenfriend et al. |
| 6,032,216 A | 2/2000 | Schmuck et al. |
| 6,950,833 B2 | 9/2005 | Costello et al. |
| 7,069,270 B1 * | 6/2006 | Kumar ................................ 1/1 |
| 7,203,801 B1 * | 4/2007 | Sharma et al. ............... 711/148 |
| 7,404,037 B1 * | 7/2008 | Kiselev .......................... 711/114 |
| 7,448,077 B2 * | 11/2008 | Curran et al. ................... 726/12 |
| 2004/0153479 A1 | 8/2004 | Mikesell et al. |
| 2005/0015384 A1 | 1/2005 | Wehrman et al. |
| 2006/0074940 A1 | 4/2006 | Craft et al. |
| 2007/0103984 A1 | 5/2007 | Kavuri et al. |

FOREIGN PATENT DOCUMENTS
WO    WO2007035062 A1    3/2007
* cited by examiner

Primary Examiner — Viet Vu
(74) Attorney, Agent, or Firm — Cantor Colburn LLP; William A. Kinnaman, Jr.

(57) ABSTRACT

Methods and devices are provided for sharing data across two or more different clusters. An operating system (OS) in a cluster checks a metadata record of a file system of a shared device to retrieve path group identifiers (PGIDs). A control unit list of the shared device is checked to retrieve PGIDs that are active on the shared device. An input/output supervisor (IOS) record in a couple dataset is checked to retrieve PGIDs in the cluster. The metadata record, control unit list, and IOS record are compared, and if a PGID is found in the metadata record that is not in the IOS record and if the found PGID is not in the control unit list, the found PGID is not active on the shared device. The found PGID of the different cluster is removed from metadata record, and members of the cluster can R/W to file system.

20 Claims, 9 Drawing Sheets

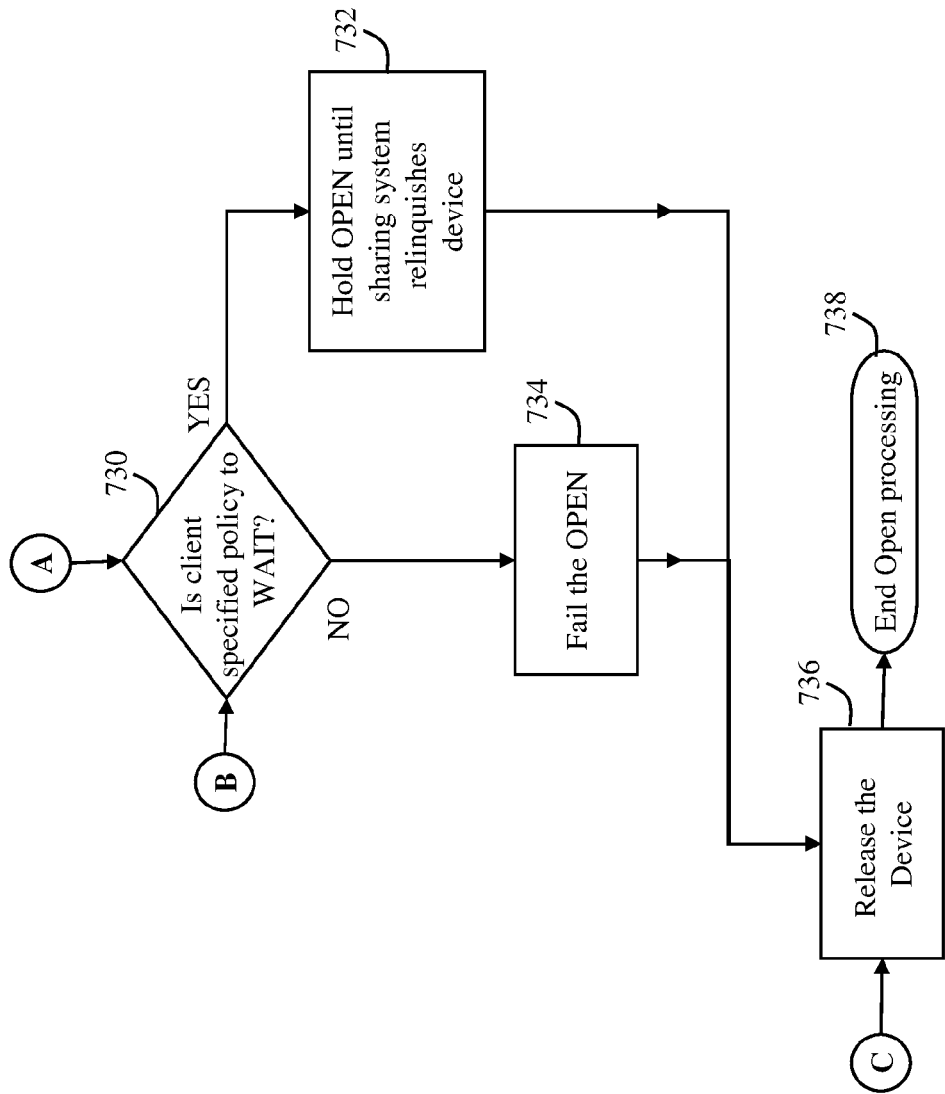

SHARING OF DATA ACROSS DISJOINT CLUSTERS

BACKGROUND

Exemplary embodiments relate to safely sharing data across disjoint clusters, and more specifically, to safely sharing data across disjoint clusters with reliability, availability, and integrity.

Clustered operating systems, such as IBM's z/OS®, provide system services that allow serialization of shared resources among all operating system images in the cluster as well as caching of data into a shared resource such as an IBM® System z coupling facility. In z/OS®, system services such as ENQUE and DEQUE provided by the Global Resource Serialization (GRS) component provide serialization semaphores. The XES component of z/OS provides the system services to allow caching of data in the coupling facility. These services are limited in scope to a single cluster, a set of operating system images (or instances) configured to communicate with each over sharing resources.

System clusters are typically dynamic, allowing operating system images to come and go based on customer goals for the work load, testing, and development requirements. Often when systems are removed from a cluster and either form their own new cluster, or join a different cluster, accessibility to the I/O resources is not changed. Continued access to data is not prevented. Some of the data requires the use of the system semaphores to provide serialized access for purposes such as updating directories and other metadata. If serialization is not performed correctly applications may access the wrong data and fail or experience unpredictable results.

BRIEF SUMMARY

According to one exemplary embodiment, a method is provided for sharing data across two or more different clusters. An operating system in a cluster checks a metadata record of a file system (or dataset) of a shared device to retrieve path group identifiers (PGIDs) in the metadata record, and the path group identifiers in the metadata record indicate that the corresponding host operating systems with the path group identifiers are actively using the file system or dataset. The cluster includes one or more member operating systems. The operating system checks a control unit managed list of the path group identifiers that are active on the shared control unit/device. The operating system checks an input/output supervisor (IOS) record in a couple dataset residing on a shared device to retrieve path group identifiers for the cluster, and the IOS record indicates that the path group identifiers are in the same cluster. For further information, reference is made to U.S. Pat. No. 5,471,609 entitled Method For Identifying A System Holding A Reserve, which is herein incorporated by reference. The operating system compares the metadata record of the file system (or dataset), the control unit list, and the IOS record in the couple dataset. From the comparison, if the operating system finds a PGID in the metadata record that is not in the IOS record, the operating system determines that the found PGID is in a different cluster, and if the found PGID is not in the control unit list, the operating system determines that the found PGID is not active on the shared device. In response to the found PGID not being in the IOS record and not being in the control unit list, the operating system removes the found PGID of the different cluster from the metadata record of the file system. In response to the found PGID of the different cluster being removed from the metadata record of the file system by the operating system, the operating system allows the members of the cluster to read and write to the file system when the found PGID is removed.

According to one exemplary embodiment, a method is provided for sharing data on shared devices across two or more different clusters. Path group identifiers (PGIDs) for members of a single cluster are stored in an input/output supervisor (IOS) record of a shared device. Path group identifiers that are active on the shared device are stored in a control unit managed list. Path group identifiers that are actively accessing the file system are stored in a metadata record of a file system of the shared device. When the shared device causes the file system to enter the read multi-cluster state, the single cluster and different clusters can read the file system. When the shared device causes the file system to enter the read single cluster state, the single cluster can read the file system. When the shared device causes the file system to enter the read and write single cluster state, the single cluster can read and write to the file system. If the shared device checks and has found a path group identifier (PGID) of the different clusters in the metadata record of the file system, if the shared device checks and does not locate the found PGID in the IOS record, and if the shared device checks and does not locate the found PGID in the control unit list, the shared device is operative to enter the read single cluster state and/or the read and write single cluster state.

Additional features are realized through the techniques of the present disclosure. Other systems, methods, apparatus, devices, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIGS. 7A and 7B illustrate the OPEN operating system method in accordance with exemplary embodiments.

DETAILED DESCRIPTION

Figure 1:
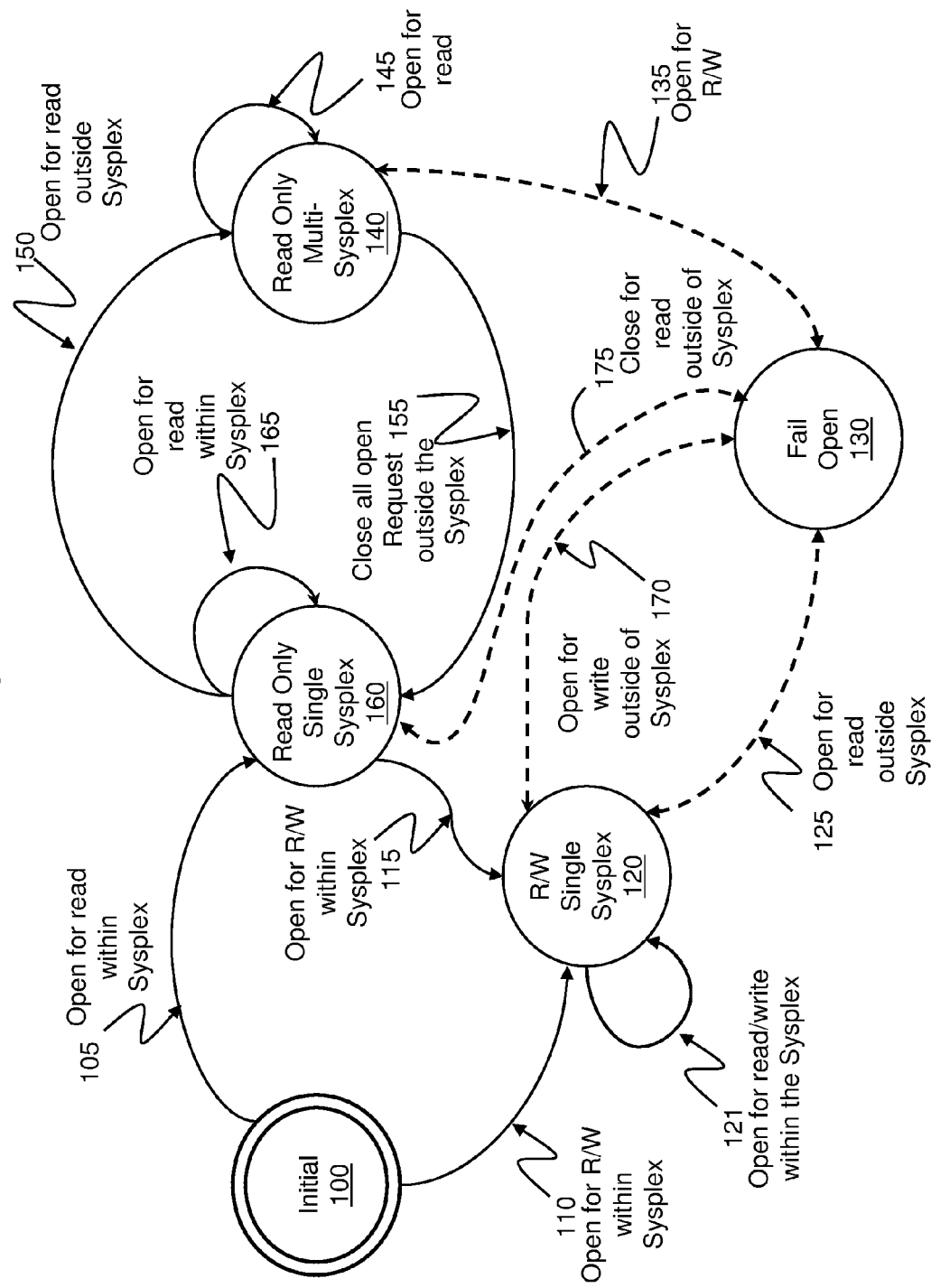
FIG. 1 illustrates state transitions that occur in each cluster as data is accessed by operating systems in accordance with exemplary embodiments.

Exemplary embodiments provide a method, system, and program for safely sharing data across disjoint clusters with reliability, availability, and integrity. For example, sharing data (files or data sets) across clusters is defined to be simultaneous read-only access from two or more clusters, and write access to the data is limited to a single cluster. Only a single cluster is permitted to be accessing data with write authority at one time in accordance with exemplary embodiments.

For illustration purposes only, many references and examples may be made to IBM® products, services, systems, and devices. It is understood by those skilled in the art that exemplary embodiments are not meant to be limited to specific examples or elements described in examples.

In order for two or more operating system images (which are instances of the operating system) to safely share data that resides on shared disks a protocol needs to be adhered that preserves data integrity. Disk storage is a general category of a computer storage mechanism, in which data may be recorded on planar, round, rotating surfaces (disks, discs, or platters), and solid state disk (i.e., flash memory). A disk drive is a peripheral device used to record and retrieve information. There are many different types of implementations for disks such as hard disks, optical discs, etc.

Messages need to be passed in order to serialize the use of metadata (e.g. free space), invalidate cached data blocks, relocate data (e.g., compress), etc. These homogeneous sharing systems are tied together to form what are called clusters. For z/OS®, a cluster of operating systems cooperatively executing a work load and sharing data is called a Parallel Sysplex® (or, generically, a sysplex). Customers often need to create multiple disjoint clusters in order to safely separate different production workloads, test systems, and development systems. These separate clusters may share the same physical infrastructure even though they are isolated from each other and do not cooperatively share data. The physical infrastructure includes running in the same physical processor(s), albeit different logical partitions, sharing the same physical storage area network (SAN), sharing the same physical storage subsystems and in some cases the same logical devices. When logical devices are shared across clusters the metadata that describes the logical volume (e.g., such as a volume table of contents (vtoc), vtoc index, etc.) is serialized via a device reserve and release commands. These commands allow the execution of multiple channel programs atomically. Datasets and file systems that may reside on the volumes are not allowed to be shared as there is no communication possible between the multiple clusters that would serialize on the data and allow local caching with data integrity.

The IBM z/OS® Partitioned Dataset Extended (PDSE) file system is an example of a file system that is not allowed to be shared across clusters. The Hierarchical File System (HFS) and the z/OS® File System (zFS) are two other examples of file systems that are not allowed to share data outside the cluster because of the lack of communication for safe caching and use of metadata. However, exemplary embodiments are configured to modify these files systems to allow for safe sharing of data as discussed herein. In computing, a file system is a method for storing and organizing computer files and the data they contain to make it easy to find and access them. File systems may use a data storage device such as a hard disk and involve maintaining the physical location of the files; file systems might provide access to data on a file server by acting as clients for a network protocol, or the file system may be virtual and exist only as an access method for virtual data.

Issues may arise for customers when they make configuration changes, catalog changes, or other logical errors such that the PDSE files are accidentally made accessible across clusters. Unpredictable results may occur and data may be corrupted. A simple example is when PDSEs are used to contain program libraries. When a new version of a product needs to be installed, if the installation does not occur from a system in the cluster that is allowed to share the data, the new version of the program can occupy unpredictable portions of the disk as the other cluster caches data and compresses the data on the fly.

Consequently, exemplary embodiments provide a mechanism to detect when two disjoint clusters are sharing a file system or dataset such as PDSE (or HFS and zFS) file systems and detect when data integrity is at risk by keeping metadata tokens directly in the file system (e.g., the PDSE) itself. A cluster includes one or more operating system images running on one or more machines, devices, and/or systems. The machines, devices, and systems may be physical hardware and software or they may be instances of (i.e., virtual) machines, devices, and systems as understood by one skilled in the art. For example, two disjoint clusters may be permitted to share a PDSE when all the sharing clusters are accessing for read only. Additionally, the customer specified policy for the PDSE can fail any shared access to data across disjoint clusters. A cluster may open a PDSE for updates if it is the only cluster accessing the data. Any other cluster trying to open for read or write access will either wait or fail. If the first cluster opens for read access, any subsequent clusters that attempt to open for write access will wait or fail based on customer specified policy. Exemplary embodiments also provide a means for identifying those systems that are sharing the data via a set of metadata tokens kept within the PDSE file system. The metadata tokens are kept in the form of Path Group Identifiers (PGIDs), a well known format that uniquely identifies an operating system instance. A mechanism is also provided that will allow the sharing systems to automatically clean up invalid metadata that may be residual from an operating system instance that is no longer active but failed to clean up its own metadata.

Further regarding the operating system referred to as the z/OS®, the z/OS®manages data by means of data sets. The term dataset refers to a file that contains one or more records. The record is the basic unit of information used by a program running on z/OS®. Any named group of records is called a dataset. Datasets can hold information such as medical records or insurance records, to be used by a program running on the system. Datasets are also used to store information needed by applications or the operating system itself, such as source programs, macro libraries, or system variables or parameters. For datasets that contain readable text, you can print them or display them on a console (many datasets contain load modules or other binary data that is not really printable). Datasets can be cataloged, which permits the dataset to be referred to by name without specifying where it is stored.

Figure 2:
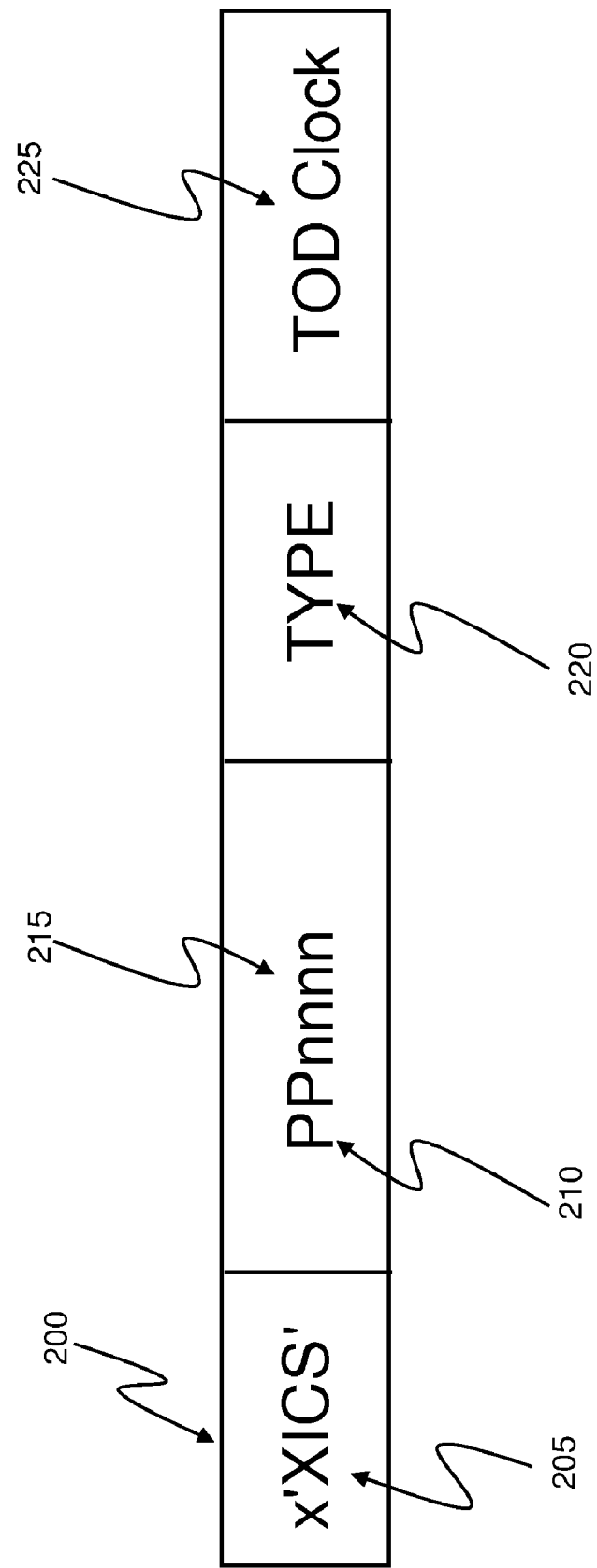
FIG. 2 illustrates an example of a format of the system Path Group Identifier (PGID), which is a world wide unique token that represents the operating system instance in accordance with exemplary embodiments.

Below, reference will be made to figures to further explain exemplary embodiments. During operating system initialization, e.g., the initial program load (IPL), the operating system constructs a world wide unique identifier that is used to identify a specific instance of that operating system image. This world wide unique identifier is called the Path Group Identifier (PGID). FIG. 2 illustrates an example of the format and contents of a PGID 200. The PGID 200 may consist of eleven bytes of data.

Figure 5:
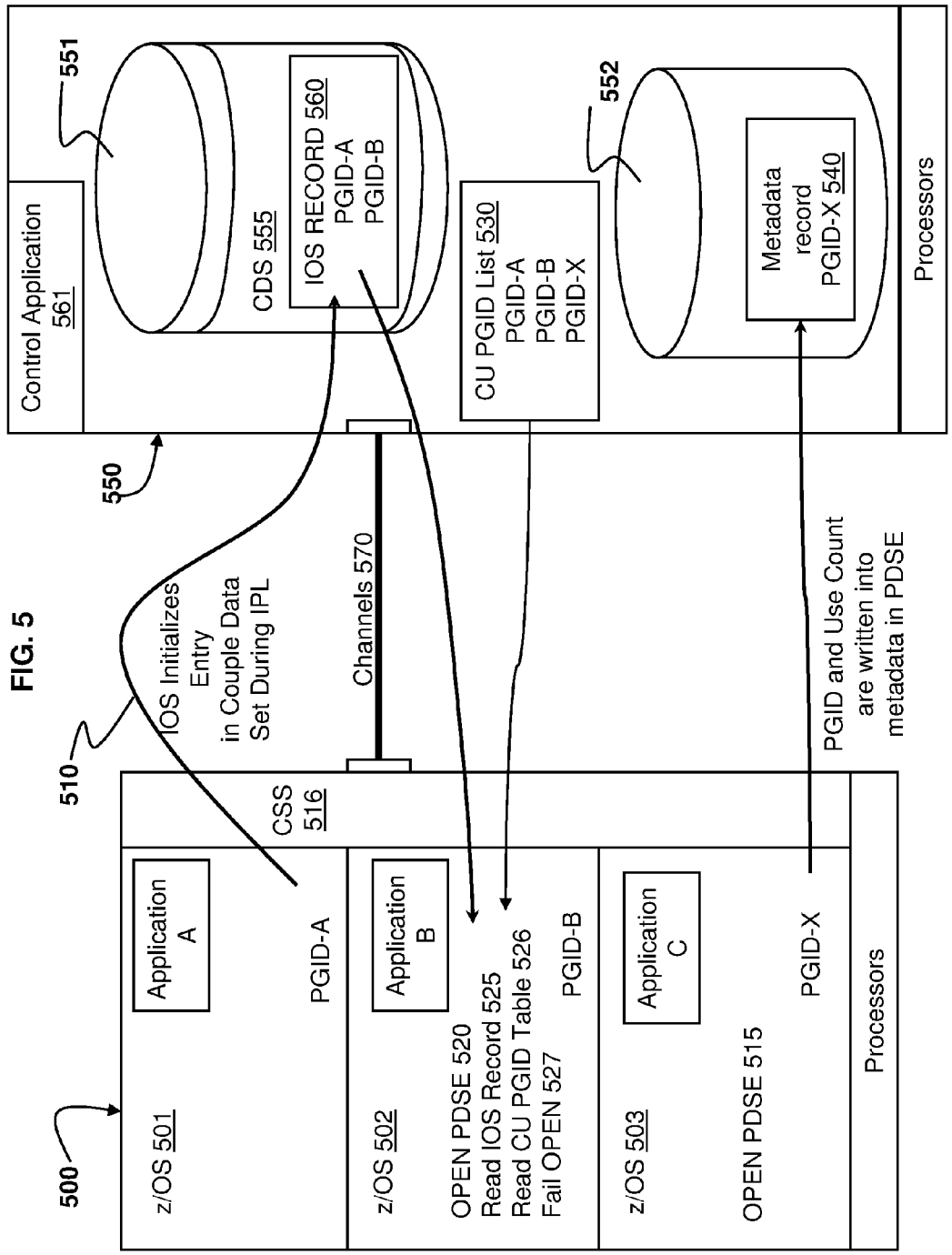
FIG. 5 illustrates a system in accordance with exemplary embodiments.

The first byte 205 contains a two bit format identifier, a flag indicating if the PGID 200 was created by a hypervisor (such as, e.g., z/VM® operating system hypervisor) and a four bit channel subsystem identifier (CS) that identifies logical channel subsystem (CSS) 516 associated with logical partitions 501, 502, and 503 as shown in FIG. 5.

The one byte LPAR (logical partition) identifier 210 and the last four digits of the CPU serial number 215 are included in the PGID 200. A two byte CPU model type 220 is included and also, the high order four bytes of the time-of-day clock 225 are also included in the PGID 200.

As each operating system completes initialization (e.g., such as 510 shown in FIG. 5) it joins the cluster of systems designated by the customer. As noted above, for the IBM z/OS® operating system, a cluster of operating systems is known as a Parallel Sysplex.

Now turning to FIG. 5, FIG. 5 illustrates a block diagram that can be used to depict operations by each operating system instance and cluster to track the usage of files and perform the necessary clean up functions when errors occur in accordance with exemplary embodiments.

In FIG. 5, one or more servers 500 (or mainframes or any type of computing devices) may be operatively connected to one or more storage subsystems/control units 550 by channels 570. The server 500 communicates with the storage subsystems 550 via the CSS 516. The storage subsystem/control unit 550 can generally represent a shared device (or system), such as a computing device, a storage device, and/or a direct access storage device (DASD). For explanation purposes, operating systems of logical partitions 501 and 502 are members of a Parallel Sysplex, which is a single cluster, and the operating system of logical partition 503 (e.g., with other operating systems not shown) is in another Parallel Sysplex which is a second cluster. At times, the terms logical partition and operating system (or operating system instance) may be used interchangeably since each operating system corresponds to a particular logical partition.

Every Parallel Sysplex maintains a couple dataset which contains state information for each member of the Parallel Sysplex. Each operating system instance 501 and 502 initializes and joins the Parallel Sysplex which includes writing 510 an input/output supervisor (IOS) record 560 in a designated slot of the couple dataset 555. The sysplex includes a number of interconnected computer systems (which are logical partitions 501 and 502 in the server 500 for this example) communicating through, e.g., a cross system coupling facility (XCF) which is the software component that manages communication across the sysplex as understood by one skilled in the art. An operating system instance that is part of the sysplex may be referred to as an operating system member, so there are two operating system members 501 and 502 in the sysplex. Each operating system member 501 and 502 of the sysplex has its own designated slot in the couple dataset 555, and there could be numerous slots for all potential operating system members in the couple dataset 555. The couple dataset 555 represents one collection of contiguous records (portion) of the couple dataset volume 551. Each operating system instance 501 and 502 that resides in the same Parallel Sysplex will share the same couple dataset 555. Therefore, each operating system 501 and 502 in the sysplex knows the PGID 200 value of all the other operating systems in the same Parallel Sysplex based on the contents of the couple dataset 555. Since the operating system instances 501 and 502 are in the same sysplex (i.e., cluster), they both know their respective PGIDs from the IOS record 510, which are PGID-A and PGID-B. For example, a table look-up operation can be preformed by the operating system instances 501 and/or 502 into the IOS (I/O supervisor) record 560 located in the couple dataset 555 of the couple dataset volume 551 to obtain their respective PGIDs.

Figure 3:
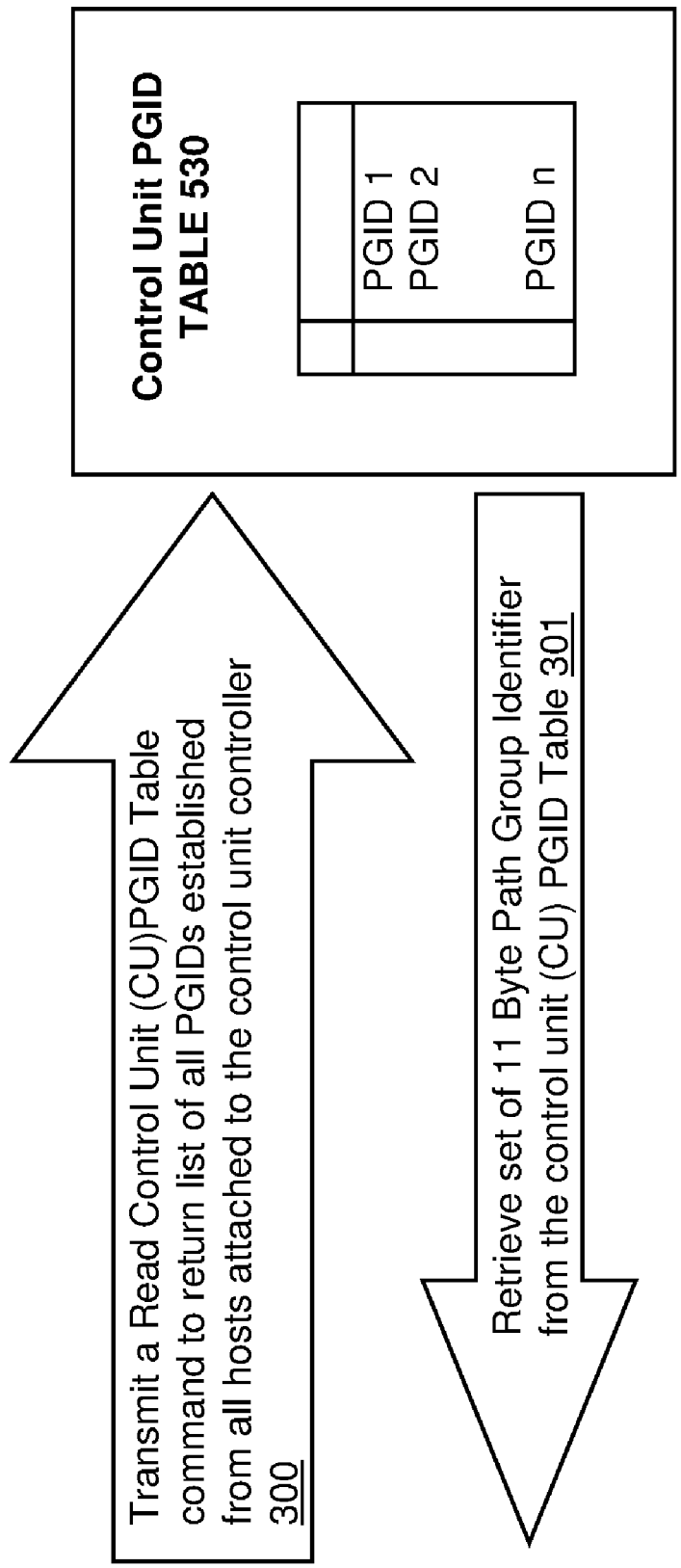
FIG. 3 illustrates an example of requesting and returning data from a control unit PGID table by the Read Control Unit PGID Table command in accordance with exemplary embodiments.

During system initialization the operating system 501 or 502 initializes every volume 551 and 552 (and there may be numerous other volumes not shown for conciseness) by writing the system PGID 200 to every path (represented as channels 570) to every volume 551 and 552 used by that operating system instance. Each volume 551 and 552 may include and/or be operatively connected to one or more direct access storage devices (DASD). The control unit application 561 that manages the storage subsystem/control unit 550 and the DASD of the volumes 551 and 552 will keep track of every PGID in the a control unit (CU) PGID list 530 used to access the volumes 551 and 552 managed by that control unit 550. The complete table of PGIDs in the CU PGID list 530 may be read by any operating system 501, 502, and/or 503 with access to the control unit 550 and the CU PGID list 530 indicates every PGID currently accessing the storage subsystem/control unit 550. A Read Control Unit PGID Table command 300 is used to read the table of active PGIDs in the CU PGID list 530 as shown in FIG. 3. As a result of the read command 300, every active PGID in the CU PGID table 530 is returned 301 over the channel 570 (which may, e.g., be an enterprise systems connection (ESCON) and/or a fiber connector (FICON)) to the operating system 501 and/or 502.

Applications A, B, and C respectively running in the z/OS operating systems 501, 502, and 503 can choose to use file systems such as the z/OS File System (zFS), Hierarchical File System (HFS), Partitioned Data Set Extended (PDSE), Virtual Storage Access Method (VSAM), etc. The example shown in this exemplary embodiment uses PDSE files in the PDSE volume 552.

Figure 4:
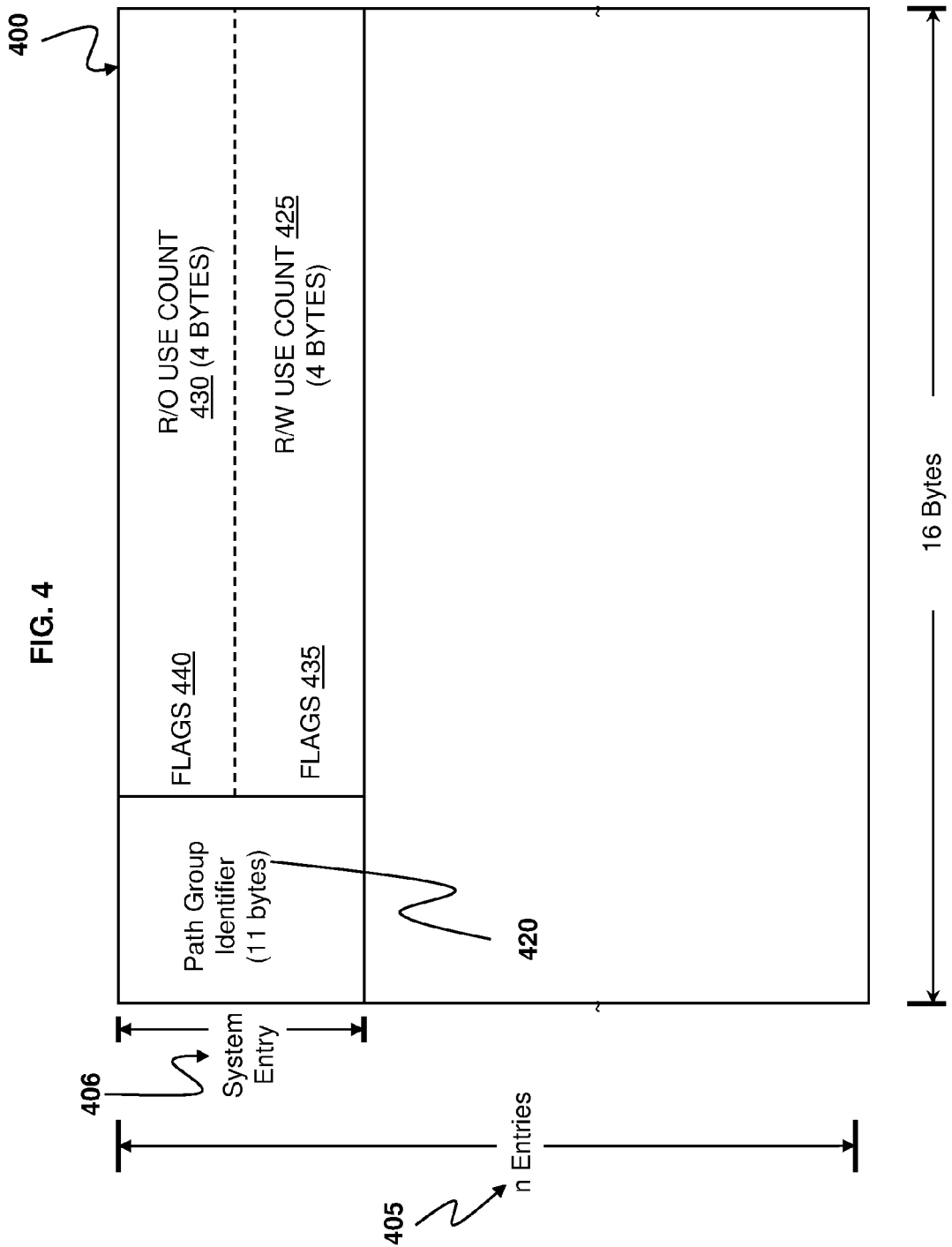
FIG. 4 illustrates example contents of the metadata added to files in a file system to track the usage across all sharing operating systems in accordance with exemplary embodiments.

When, e.g., the application C is started, the operating system instance 503 allocates the PDSE dataset on the shared volume 552 and performs an OPEN operation 515 (on behalf of the application C) in order to access the data in the PSDE dataset residing on volume 552. The OPEN operation 515 of the operating system instance 503 performs various operating system functions including authenticating that the user is indeed authorized to access the subject PDSE dataset on volume 552. The OPEN process 515 by the operating system instance 503 will also include the following steps. The PDSE volume 552 is reserved (I/O device command) by the operating system instance 503, and metadata 400 for the metadata record 540 is read and written to by the operating system instance 503 as shown in FIG. 400. FIG. 4 illustrates example contents of the metadata 400 added to the metadata record 540 in the PDSE volume 552 to track usage of the PDSE volume 552 across all sharing operating systems (such as operating system instances 501, 502, and 503) in accordance with exemplary embodiments.

If the operating system instance 503 determines that there is no active metadata 400 in the metadata record 540, then the operating system instance 503 determines that it is the first operating system 503 accessing the metadata record 540 in the PDSE volume 552. The metadata 400 related to the operating system instance 503 is written back to the metadata record 540 of the PDSE volume 552 in an example format shown in FIG. 4. In FIG. 4, an open metadata slot is located for a system entry 406 by the operating system instance 503. It is understood that metadata slots for n system entries 405 may be included in the metadata record 540. The PGID-X (such as, e.g., PGID 200) of the operating system instance 503 is written to the designated metadata slot 420 by the operating system instance 503. If the OPEN command was for read only mode for the operating system instance 503, then the read-only use count 430 is incremented in the metadata of the PDSE volume 540. The read only use count 430 is a counter that is incremented for each PGID (corresponding to an operating system instance) that accesses the PDSE volume 540 for read only access.

If the OPEN operation 515 of the operating system instance 503 was for read/write access to the PDSE volume 552, then the read/write use count 425 is incremented in the PDSE 535. A flag 435 or 440, indicating that the metadata slot is in use, is respectively set for read only (R/O) or read and write (R/W) for the system entry 406. The metadata 400 is written to the metadata record 540 by the operating system instance 503, and the PDSE volume 552 reservation is released by the operating system instance 503. If the application C in the operating system 503 terminates, the file system is released by the reserving operation system instance 503 and the metadata slot is written as zeros (see FIG. 8). If the operating system 503 instance itself fails, an I/O system reset is issued by the channel subsystem (CSS) 516 on behalf of the operating system 503. The system reset (issued by the by the CSS 516) signals the control unit application 561 to remove the host path group identifier from the control unit PGID table 530 corresponding to the failed operating system 503. Performing this I/O system reset process enables sharing operating systems inside and outside the cluster to clean up the residual PGIDs in the metadata record 540. Although the above example is discussed for operating system instance 503, the process of reading and writing metadata 440 (such as respective PGIDs) occurs for operating systems 501 and 502 when they access the PDSE volume 552.

The application B in the second operating system instance 502 starts. During an OPEN operation 520, the operating system instance 502 begins to access the same metadata record 540. When the OPEN process 520 is performed, the PDSE volume 552 is reserved and the metadata 400 in the metadata record 540 is read by the operating system 502. For this example, the OPEN process 520 occurs after the OPEN process 515 of the operating system 503 has occurred, and accordingly, the operating system 502 locates and finds one or more valid entries 406 with flags 425 or 430 in the metadata record 540 in the PDSE volume 552. In this example, the operating system instance 502 finds PGID-X corresponding to the operating system 503 in the metadata of the metadata record 540 and finds the flag 440 selected for read only. Since the operating system 503 is a different (outside) cluster, the flag 435 indicating read and write for the PDSE volume 552 could not have been selected by the operating system 503.

The OPEN processing by the operating system 502 then proceeds to read the IOS record 560 from the couple dataset 555. In this example, from the IOS record 560, the operating system instance 502 reads the PGID-A corresponding to operating system instance 501 and PGID-B corresponding to the operating system instance 502. The IOS records 560 contains all the PGIDs in the cluster (or sysplex), and as can be seen, PGID-X is not in the same cluster as PGID-A and PGID-B because PGID-X is not in the IOS records 560. If any of the PGIDs contained in the file system metadata 400 of the metadata record 540 are not also contained in the IOS record 560 (such as PGID-X), then the file system of the PDSE volume 552 may be being shared outside of the sysplex.

The Read Control Unit PGID Table command 300 is issued to the control unit 550 to get a list of all the active PGIDs in the control unit (CU) PGID list 530. The CU PGID list 530 contains all PGIDs that a currently accessing the control unit 555. If the PGID that was found to be in the metadata of the metadata record 540 but outside of the sysplex is also an active PGID in the control unit PGID list 530 as returned 301 by the Read Control Unit Path Group ID Table command 300, then the OPEN process for the operating system instance 502 will either succeed or fail as described in a state transition diagram shown in FIG. 1. If the request by the operating system 502 is a R/W request, the operating system 502 will fail 527 the request because there cannot be any writing to the PDSE volume 552 by the operating system 502 when an outside sysplex (i.e., a multi-sysplex state) which is operating system 503 is reading the PDSE volume 522.

Although the PGID-X is shown in the CU PGID list 530, now assume for this example that the PGID data (e.g., PGID-X) is not found among the active PGIDs in the CU PGID list 530 returned by Read Control Unit PGID Table command 300 of the operating system 502; then the operating system 503 must have failed before the metadata (such as PGID-X) in the metadata record 540 could be removed (cleaned up) from the PDSE volume 552 file system. As such, the operating system 502 recognizes that the PGID-X is not in the CU PGID list 530 but is in the metadata record 540. The PDSE volume 522 is reserved by the operating system 502 and the metadata 400 corresponding to the PGID-X is zeroed (i.e., cleaned up) in the metadata record 540 indicating that the PGID-X is no longer currently accessing the PDSE volume 552. As such, other members of the cluster (such as the operating system 501) can write to the PDSE volume 552.

Now turning to FIG. 1, FIG. 1 illustrates a state transition diagram in accordance with exemplary embodiments. The state transition diagram illustrates various scenarios according to exemplary embodiments.

A file system or PDSE dataset which is residing on volume 552 initially starts in an initial state 100 where no operating systems (such as 501, 502, and 503) are running applications (such as applications A, B, and C) that access the PDSE volume 552 file system. If the PDSE volume 552 file system is initially opened for read-only access 105 by the operating system instance 501, then the file system enters the read-only state within a single sysplex 160. Additional open requests for read-only from within the sysplex 165 will not cause the file system to leave the 160 state.

An open request for read-only access from outside the sysplex 150 will cause the file system to enter the read-only state for multiple sysplex 140. This transition can be allowed or disallowed by the operating system OPEN process 520 based on customer specified policy for the installation.

Additional open read only requests 145 will leave the PDSE volume 552 file system in the read-only multiple sysplex state 140. If an operating system instance attempts to open the file system for read/write access 135, the open request is rejected and the operation system's access fails 130. If while in the read-only single sysplex state 160 an operating system attempts to open the PDSE dataset on volume 552 file system from outside the sysplex in read/write mode 175, the operating system's access is rejected 130. If while in the read-only single sysplex state 160 another operating system from within the same sysplex opens the file system for write access 115, then the other operating system causes the PDSE volume 552 file system to enter the read/write single sysplex state 120, which allow writing by operating system (member) of the sysplex. If while in the read only multi-sysplex state, all the open requests from outside the sysplex are relinquished (closed) 155, then the file system returns to the read-only single sysplex state 160. If all the requests to open are closed the PDSE dataset on volume 552 file system returns to the initial state 100.

If the PDSE volume 552 file system is initially opened for read/write access 110, then the file system enters the read/write state within a single sysplex 120. If while in the read-only single sysplex state 160 another operating system from within the same sysplex opens the file system for write access 115, then the file system enters the read/write single sysplex state 120. If while in the read and write single sysplex state 120, an operating system outside the sysplex attempts to open the file system for read-only access 125, then the request is rejected and the operating system fails 130. If an operating system outside the sysplex attempts to open the file system for read/write access 170, then the request is rejected and the operation system fails 130.

Client policy specified to the operating system 501, 502, and 503 can allow a violating state transition 125, 170, and 175 to the failed state 130 to alternatively have the operating system OPEN process cause the job to wait until the conditions causing the failure are removed by applications terminating.

Operating system instances 501, 502, and 503 may fail without the respective operating system software having the opportunity to delete its metadata from the file system (such as the metadata record 540 in the PDSE volume 552) that access is being relinquished from. This can happen because of a catastrophic hardware or software failure to the logical partitions 501, 502, or 503, and/or a hardware or software failure to their respective sysplex (or cluster). If the hardware or operating system software fails, the sysplex partitioning will fence that operating system image 501, 502, and 503 from the sysplex (assuming the operating systems were in the same sysplex). This fencing operation will cause an I/O system reset to be issued from the channel subsystem (CSS) 516. Additionally, operating systems that fail will load a non-restartable wait state. When this occurs the machine hypervisor firmware issues an I/O system reset signal over each channel 570 to each configured control unit 550 for the failed operating system image 503. The system reset is processed by the control application 561 and will trigger the control unit 550 to remove the PGID (corresponding to the failed operating system) from the list of active PGIDs in the CU PGID list 530 kept by the control unit 550. By removing the PGID from the CU PGID table 530 of active PGIDs, subsequent requests to OPEN (from operating systems) the PDSE volume 552 file system will not falsely detect sharing outside of the sysplex.

Figure 6:
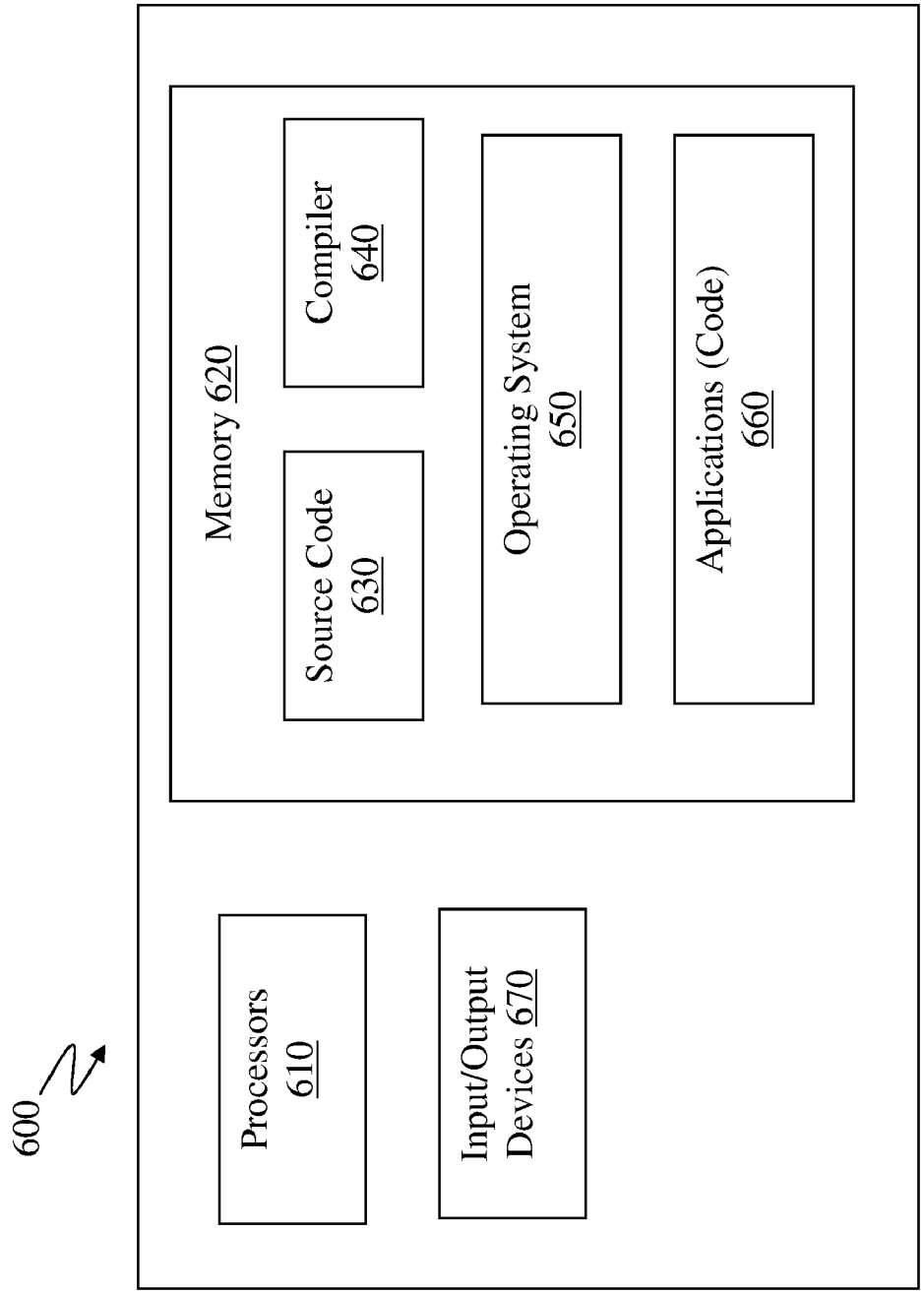
FIG. 6 illustrates an example of a computer having capabilities, which may be included in exemplary embodiments.

FIG. 6 illustrates an example of a computer 600 having capabilities, which may be included in exemplary embodiments. Various methods, procedures, modules, flow diagrams, and techniques discussed herein may also incorporate and/or utilize the capabilities of the computer 600. One or more of the capabilities of the computer 600 may be implemented in any element discussed herein, such as the server 500 and the control unit/storage subsystem 550, operating systems 501, 502, and 503, the control application 561, and the applications A, B, and C.

Generally, in terms of hardware architecture, the computer 600 may include one or more processors 610, computer readable memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 610 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 620 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, and systems discussed herein, and it is understood that additional software and hardware components may be included in the various devices and systems discussed in exemplary embodiments.

Figure 7A:
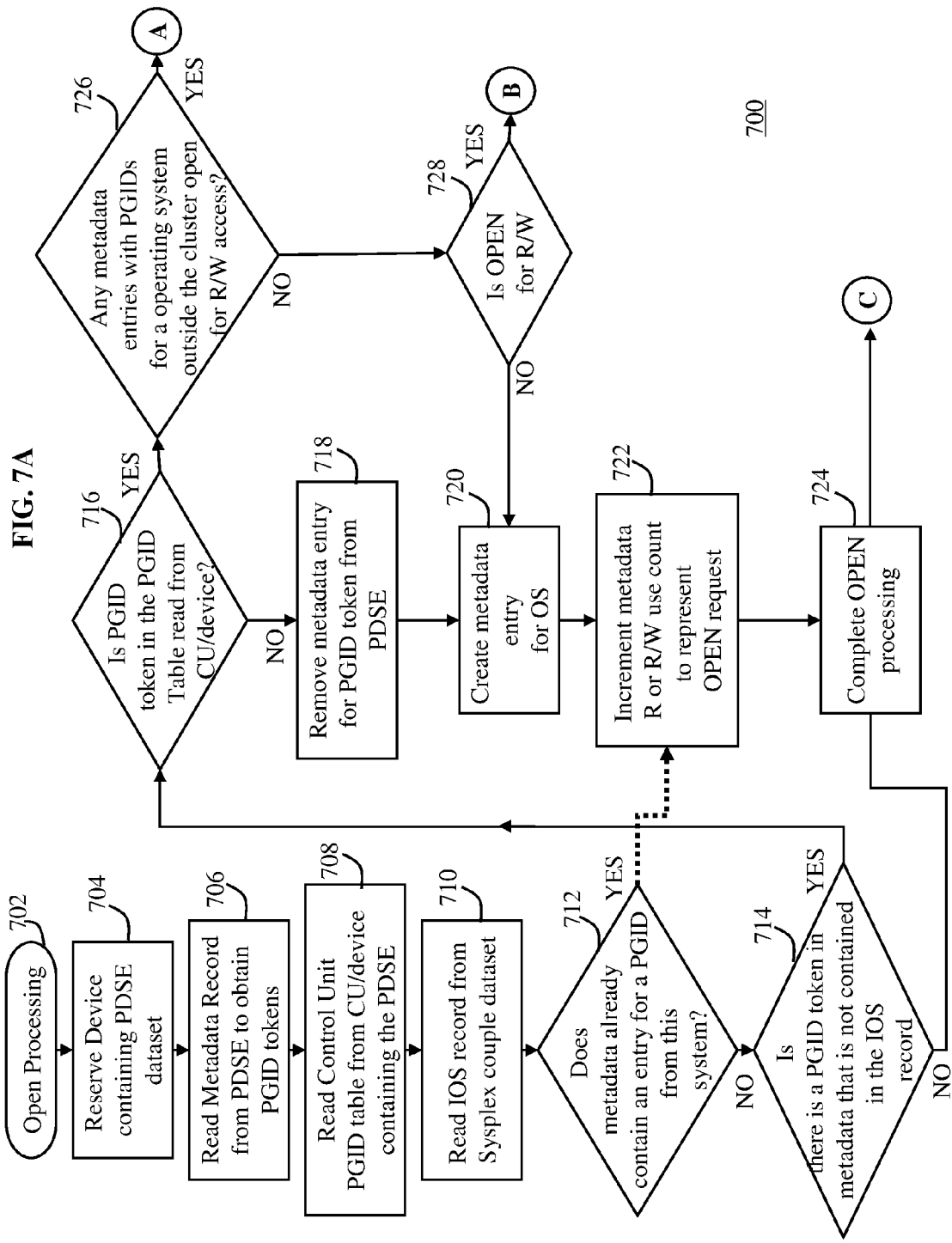

FIGS. 7A and 7B illustrate a method 700 for sharing data across two or more different clusters in accordance with exemplary embodiments. The method 700 illustrates various operations performed during an OPEN process. The OPEN process is an operating system service invoked by applications to gain access to data. The operations of the method 700 may be performed by any member of the cluster such as the operating system 501 and/or 502, and/or the operations of the method 700 may be performed by the outside clusters such as the operating system 503. Also, it is understood the operations of the method 700 may be performed by the control application 561. Further, in some exemplary embodiments, the operations of the method 700 may be cooperatively performed by the members of the cluster, such as the operating systems 501 and/or 502, along with the control application 561.

In FIG. 7A, the OPEN processing of the operating system begins at operation 702. The term operating system may be used but it is understood that the operations of the operating system may be performed by the operating systems 501, 502, and 503 in accordance with exemplary embodiments.

The operating system is operative to reserve the shared device at operation 704. The shared device may be representative of the PDSE volume 552 on the storage subsystems/control unit 550 and/or the shared device may be representative any other shared device as understood by one skilled in the art. It is also understood that the shared device is not limited to file systems or PDSE datasets.

The operating system is operative to read the metadata record 540 from the PDSE dataset on the volume 552 to obtain PGID tokens at operation 706. The PGID tokens are the path group identifiers such as PGID-A, PGID-B, and/or PGID-X.

The operating system is operative to read the control unit PGID table 530 from the control unit 550 containing the PDSE volume 552 at operation 708.

The operating system is operative to read the input/output supervisor (IOS) record 560 from the Sysplex couple dataset 555 on the volume 551 at operation 710.

The operating system is operative to determine if the metadata of the metadata record 540 already contains an entry for a PGID from this system at operation 712. If YES to operation 712, the operating system is operative to increment the metadata read or read/write use count (e.g., use counts 430 and 425 in FIG. 4) to represent the OPEN request at operation 722.

If NO to operation 712, the operating system is operative to determine is there a PGID token in the metadata of the metadata record 540 that is not contained in the IOS record 560 of the couple dataset 555 at operation 714.

If NO to operation 714, the operating system is operative to complete open processing at operation 724 and flow to operation 736 in FIG. 7B.

If YES to operation 714 which indicates that there is a PGID token contained in the metadata record 540 that is not contained in the IOS record 560, the operating system is operative to determine if the PGID token is in the control list PGID table 530 read from the control unit 550 at operation 716.

If NO to operation 716, the operating system is operative to remove the metadata entry for the PGID token from (the metadata record 540 in) the PDSE volume 552 at operation 718. The operating system is operative to create a metadata entry for the operating system performing the OPEN processing at operation 720. The operating system is operative to increment the metadata read or read/write use count to represent the particular OPEN request of the operating system at operation 722. The operating system is operative to complete the OPEN processing at operation 724 and flow to operation 736 in FIG. 7B. For example, the operating system is allowed to access and perform the desired read and/or read/write request to the PDSE volume 552.

If YES to operation 716 which indicates that the PGID token is in the control unit PGID table 503, the operating system is operative to determine if any metadata entries (of the metadata record 540) with PGIDs for an operating system outside the cluster are open for read/write access at operation 726. If YES to operation 726, the operating system is operative to flow to operation 730 in FIG. 7B.

IF NO to operation 726, the operating system is operative to determine if the PGID of the operating system outside the cluster is open for read/write at operation 728. If YES to operation 728, the operating system is operative to flow to operation 730 in FIG. 7B.

If NO to operation 726, the operating system is operative to create a metadata entry for the operating system requesting the OPEN processing at operation 720.

In FIG. 7B, the operating system is operative to determine if there is a client specified policy to wait at operation 730. The client policy may be stored in memory of the control unit 550 and be accessible to the operating system requesting the OPEN as understood by one skilled in the art.

If YES to operation 730, the operating system is operative to hold the OPEN request for the PDSE volume 552 until the sharing operating system relinquishes the PDSE volume 552 at operation 732.

If NO to operation 730, the operating system is operative to fail the OPEN request of the operating system at operation 734.

The operating system is operative to release the PDSE volume 552 at operation 736 and the OPEN processing ends at operation 738.

Figure 8:
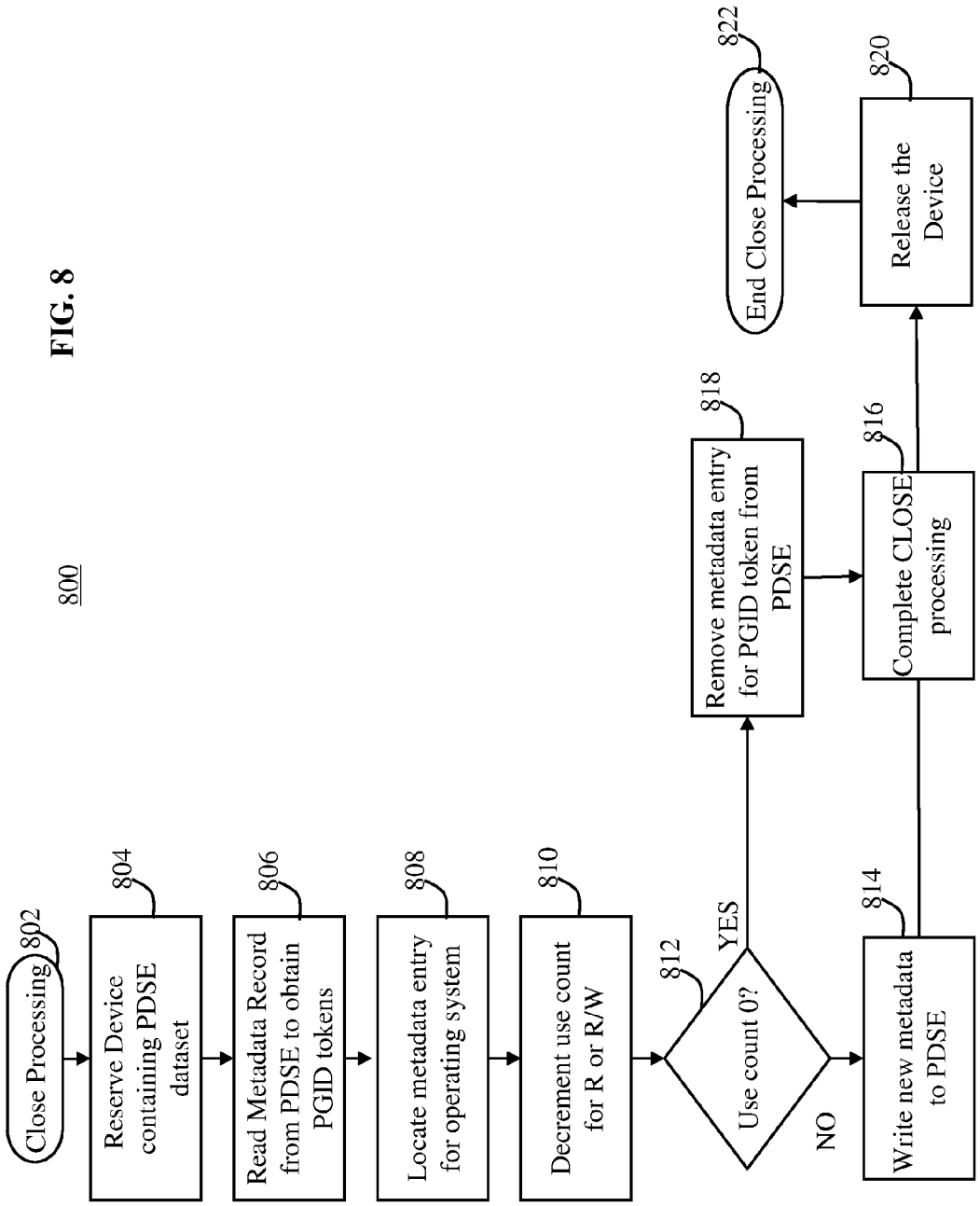
FIG. 8 illustrates the CLOSE operating system method in accordance with exemplary embodiments.

FIG. 8 illustrates a method 800 for sharing data on a shared device across two or more different clusters in accordance with exemplary embodiments. The method 800 illustrates various operations performed during a CLOSE process. As mentioned above, the operations of the method 800 may be performed by any member of the cluster such as the operating system 501 and/or 502, and/or the operations of the method 700 may be performed by the outside clusters such as the operating system 503. Also, it is understood the operations of the method 700 may be performed by the control application 561 and/or the CSS 516. Further, in some exemplary embodiments, the operations of the method 700 may be cooperatively performed by the operating systems, the control application 561, the CSS 516, and/or any combination thereof. Although the following example utilizes an operating system, it is understood that exemplary embodiments are not meant to be limited.

In FIG. 8, the close processing begins by the operating system at operation 802.

The operating system is operative to reserve the shared device at operation 802. For example, the shared device may be the PDSE volume 552.

The operating system is operative to read the metadata record 540 from the PDSE volume 552 to obtain PGID tokens (which are the path group identifiers) at operation 806.

The operating system is operative to locate the metadata entry for the operating system (or any other operating system) at operation 808.

The operating system is operative to decrement the use count (such as the user counts 425 and 530) for read or read/write at operation 810.

The operating system is operative to determine if the respective use count is equal to zero (0) at operation 812. If NO at operation 812 and the use count does not equal to zero, the operating system is operative to write a new metadata to the PDSE volume 552 at operation 814, and the operating system completes the CLOSE processing at operation 816.

If YES at operation 812 and the use count is equal to zero, the operating system is operative to remove the metadata entry for the PGID token from the PDSE volume 552 at operation 818. The operating system is operative to complete the CLOSE processing at operation 816.

When the CLOSE processing is complete, the operating system is operative to release the PDSE volume 552 at operation 820. The CLOSE processing ends by the operating system at operation 822.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for sharing data across two or more different clusters, comprising:
   checking, by an operating system in a cluster, a metadata record of a file system of a shared device to retrieve path group identifiers (PGIDs) in the metadata record of the file system, wherein the path group identifiers in the metadata record of the file system indicate that the path group identifiers are active in the file system, wherein the cluster comprises members and the operating system is one member of the cluster;
   checking, by the operating system, a control unit list of the shared device to retrieve path group identifiers that are active on the shared device;
   checking, by the operating system, an input/output supervisor (IOS) record in a couple dataset of the shared device to retrieve path group identifiers in the cluster, wherein the IOS record indicates that the path group identifiers are in the same cluster; and comparing, by the operating system, the metadata record of the file system, the control unit list, and the IOS record in the couple dataset;

wherein based on the comparison if a PGID is found in the metadata record that is not in the IOS record by the operating system, the operating system determines that the found PGID is in a different cluster, and if the found PGID is not in the control unit list, the operating system determines that the found PGID is not active on the shared device;

wherein in response to the found PGID not being in the IOS record and not being in the control unit list, the operating system removes the found PGID of the different cluster from the metadata record of the file system; and wherein in response to the found PGID of the different cluster being removed from the metadata record of the file system by the operating system, the operating system allows the members of the cluster to read and write to the file system when the found PGID is removed.

2. The method of claim 1, wherein if the found PGID in the metadata record of the file system is located in the IOS record by the operating system, the operating system determines that the found PGID is in the same cluster; and wherein the members of the cluster are operative to write to the file system.

3. The method of claim 1, wherein a customer specified policy for the file system can cause any shared access to data across different clusters to fail.

4. The method of claim 1, wherein the file system represents any data capable of being shared across separate clusters.

5. A method for sharing data on a shared device across two or more different clusters, comprising:

storing, in an input/output supervisor (IOS) record of a shared device, path group identifiers (PGIDs) for members of a single cluster;

storing, in a control unit list of the shared device, path group identifiers that are active on the shared device; and storing, in a metadata record of a file system of the shared device, path group identifiers that are actively accessing the file system;

wherein when the shared device causes the file system to enter a read multi-cluster state, the single cluster and different clusters can read the file system;

wherein when the shared device causes the file system to enter a read single cluster state, the single cluster can read the file system;

wherein when the shared device causes the file system to enter a read and write single cluster state, the single cluster can read and write to the file system; and wherein if the shared device checks and has found a path group identifier (PGID) of the different clusters in the metadata record of the file system, if the shared device checks and does not locate the found PGID in the IOS record, and if the shared device checks and does not locate the found PGID in the control unit list, the shared device is operative to enter at least one of the read single cluster state and the read and write single cluster state.

6. The method of claim 5, wherein if the found PGID is in the metadata record of the file system and the found PGID is in the control list, the shared device is operative to enter the read multi-cluster state.

7. The method of claim 5, wherein the found PGID represents a plurality of PGIDs;

wherein the shared device is operative to check the metadata record of the file system, the IOS record, and the control list for each of the plurality of PGIDs;

wherein if the plurality of PGIDs are not located in the IOS record and if the plurality of PGIDs are not located in the control list, the shared device is operative to enter at least one of the read single cluster state and the read and write single cluster state; and wherein the plurality of PGIDs are removed from the metadata record of the file system.

8. The method of claim 5, wherein the found PGID is removed from the metadata record of the file system on the shared device.

9. The method of claim 5, wherein when the shared device causes the file system to enter the read single cluster state, the different clusters can neither read nor write to the file system.

10. The method of claim 5, wherein when the shared device causes the file system to enter the read and write single cluster state, the different clusters neither read nor write to the file system.

11. A computing device coupled to a shared device for sharing data across two or more different clusters, comprising:

memory for storing a program; and one or more processors, functionally coupled to the memory, the processor being responsive to computer-executable instructions contained in the program and operative for:

checking a metadata record of a file system of a shared device to retrieve path group identifiers (PGID) in the metadata record of the file system, wherein the path group identifiers in the metadata record of the file system indicate that the path group identifiers are active in the file system, wherein the cluster comprises members;

checking a control unit list of the shared device to retrieve path group identifiers that are active on the shared device;

checking an input/output supervisor (IOS) record in a couple dataset of the shared device to retrieve path group identifiers in the cluster, wherein the IOS record indicates that the path group identifiers are in the same cluster; and comparing the metadata record of the file system, the control unit list, and the IOS record in the couple dataset;

wherein based on the comparison if a PGID is found in the metadata record that is not in the IOS record, the processor determines that the found PGID is in a different cluster, and if the found PGID is not in the control unit list, the processor determines that the found PGID is not active on the shared device;

wherein in response to the found PGID not being in the IOS record and not being in the control unit list, the processor removes the found PGID of the different cluster from the metadata record of the file system; and wherein in response to the found PGID of the different cluster being removed from the metadata record of the file system, the processor allows the members of the cluster to read and write to the file system when the found PGID is removed.

12. The device of claim 11, wherein if the found PGID in the metadata record of the file system is located in the IOS record by the operating system, the processor determines that the found PGID is in the same cluster; and wherein the processor allows the members of the cluster to read and write to the file system.

13. A shared device for sharing data across two or more different clusters, comprising:

memory for storing a program; and one or more processors, functionally coupled to the memory, the processor being responsive to computer-executable instructions contained in the program and operative for:

storing, in an input/output supervisor (IOS) record of a shared device, path group identifiers (PGIDs) for members of a single cluster;

storing, in a control unit list of the shared device, path group identifiers that are active on the shared device; and storing, in a metadata record of a file system of the shared device, path group identifiers that are actively accessing the file system;

wherein when the processor causes the file system to enter a read multi-cluster state, the processor is operative to allow the single cluster and different clusters to read the file system;

wherein when the processor causes the file system to enter a read single cluster state, the processor is operative to allow the single cluster to read the file system;

wherein when the processor causes the file system to enter a read and write single cluster state, the processor is operative to allow the single cluster to read and write to the file system; and wherein if the processor checks and has found a path group identifier (PGID) of the different clusters in the metadata record of the file system, if the processor checks and does not locate the found PGID in the IOS record, and if the processor checks and does not locate the found PGID in the control unit list, the processor is operative to enter at least one of the read single cluster state and the read and write single cluster state.

14. The device of claim 13, wherein if the found PGID is in the metadata record of the file system and the found PGID is in the control list, the processor is operative to enter the read multi-cluster state.

15. The device of claim 13, wherein the found PGID represents a plurality of PGIDs;

wherein the processor is operative to check the metadata record of the file system, the IOS record, and the control list for each of the plurality of PGIDs;

wherein if the plurality of PGIDs are not located in the IOS record and if the plurality of PGIDs are not located in the control list, the processor is operative to enter at least one of the read single cluster state and the read and write single cluster state; and wherein processor removes the plurality of PGIDs from the metadata record of the file system.

16. The device of claim 13, wherein the processor removes the found PGID from the metadata record of the file system.

17. The device of claim 13, wherein when the processor causes the file system to enter the read single cluster state, the different clusters can neither read nor write to the file system.

18. The device of claim 13, wherein when the processor causes the file system to enter the read and write single cluster state, the different clusters neither read nor write to the file system.

19. A computer program product, tangibly embodied on a computer readable medium, the computer program product including instructions for causing a computer to execute a method for sharing data across two or more different clusters, comprising:

checking a metadata record of a file system of a shared device to retrieve path group identifiers (PGIDs) in the metadata record of the file system, wherein the path group identifiers in the metadata record of the file system indicate that the path group identifiers are active in the file system, wherein the cluster comprises members and the operating system is one member of the cluster;

checking a control unit list of the shared device to retrieve path group identifiers that are active on the shared device;

checking an input/output supervisor (IOS) record in a couple dataset of the shared device to retrieve path group identifiers in the cluster, wherein the IOS record indicates that the path group identifiers are in the same cluster; and comparing the metadata record of the file system, the control unit list, and the IOS record in the couple dataset;

wherein based on the comparison if a PGID is found in the metadata record that is not in the IOS record, determine that the found PGID is in a different cluster, and if the found PGID is not in the control unit list, determine that the found PGID is not active on the shared device;

wherein in response to the found PGID not being in the IOS record and not being in the control unit list, remove the found PGID of the different cluster from the metadata record of the file system; and wherein in response to the found PGID of the different cluster being removed from the metadata record of the file system, allow the members of the cluster to read and write to the file system when the found PGID is removed.

20. A computer program product, tangibly embodied on a computer readable medium, the computer program product including instructions for causing a computer to execute a method for sharing data on a shared device across two or more different clusters, comprising:

storing, in an input/output supervisor (IOS) record of a shared device, path group identifiers (PGIDs) for members of a single cluster;

storing, in a control unit list of the shared device, path group identifiers that are active on the shared device; and storing, in a metadata record of a file system of the shared device, path group identifiers that are actively accessing the file system;

wherein when the shared device causes the file system to enter a read multi-cluster state, the single cluster and different clusters can read the file system;

wherein when the shared device causes the file system to enter a read single cluster state, the single cluster can read the file system;

wherein when the shared device causes the file system to enter a read and write single cluster state, the single cluster can read and write to the file system; and wherein if the shared device checks and has found a path group identifier (PGID) of the different clusters in the metadata record of the file system, if the shared device checks and does not locate the found PGID in the IOS record, and if the shared device checks and does not locate the found PGID in the control unit list, the shared device is operative to enter at least one of the read single cluster state and the read and write single cluster state.

* * * * *